Feb. 9, 1954  W. DUBILIER  2,668,935
CAPACITOR CONSTRUCTION
Filed Jan. 12, 1949  3 Sheets-Sheet 1
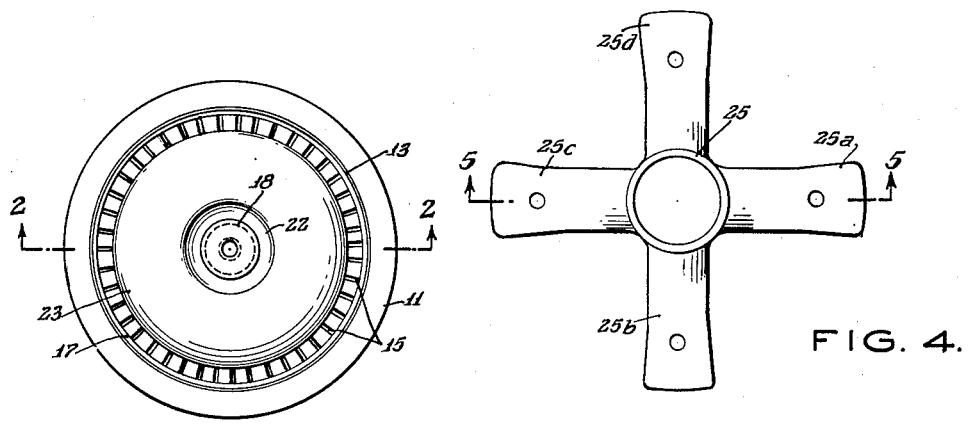
FIG. 1.  FIG. 4.
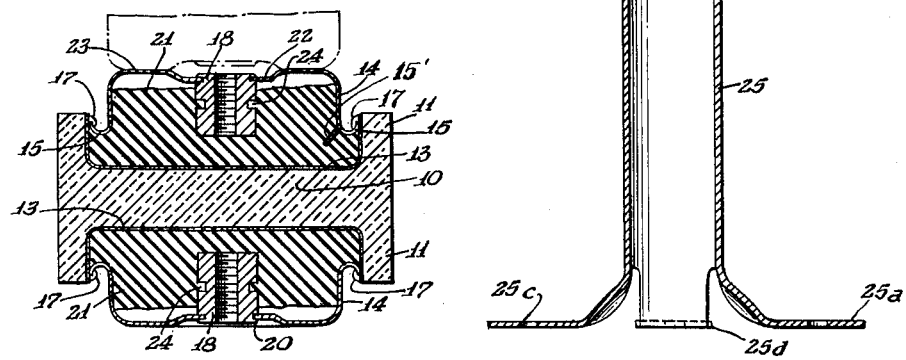
FIG. 2.  FIG. 5.
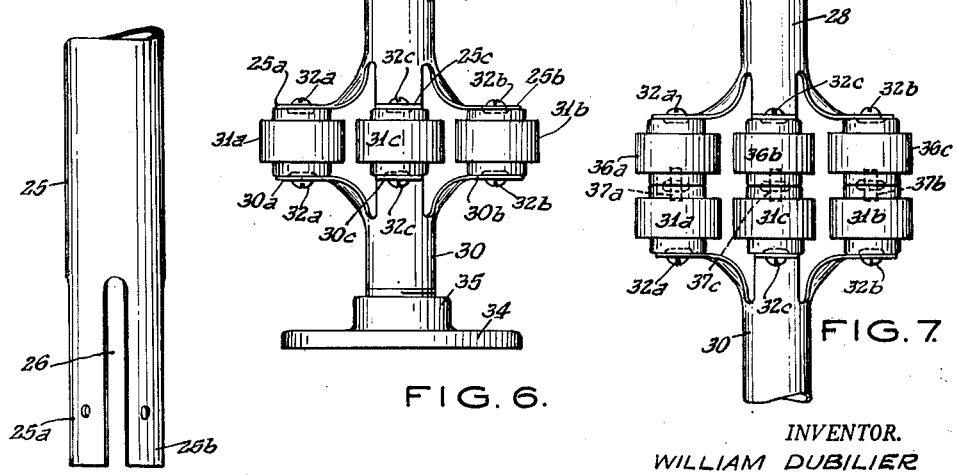
FIG. 3.  FIG. 6.  FIG. 7.
INVENTOR.
WILLIAM DUBILIER
BY
ATTORNEY.

Feb. 9, 1954 W. DUBILIER 2,668,935
CAPACITOR CONSTRUCTION
Filed Jan. 12, 1949 3 Sheets-Sheet 2
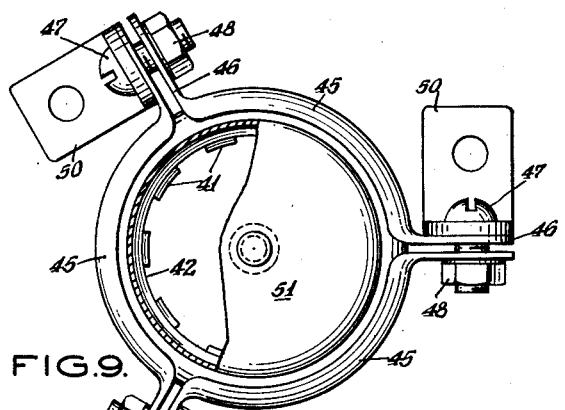
FIG.9.
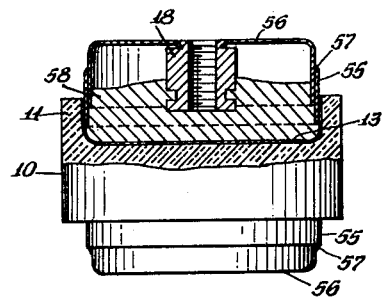
FIG.10
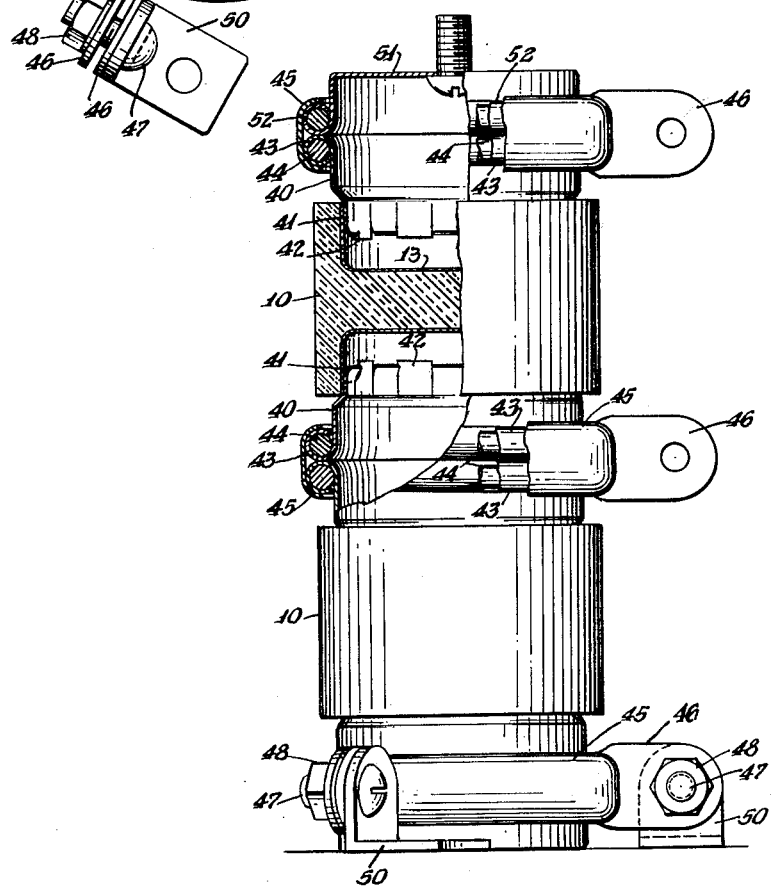
FIG.8.
INVENTOR
WILLIAM DUBILIER
BY 
ATTORNEY Feb. 9, 1954 W. DUBILIER 2,668,935
CAPACITOR CONSTRUCTION
Filed Jan. 12, 1949 3 Sheets-Sheet 3
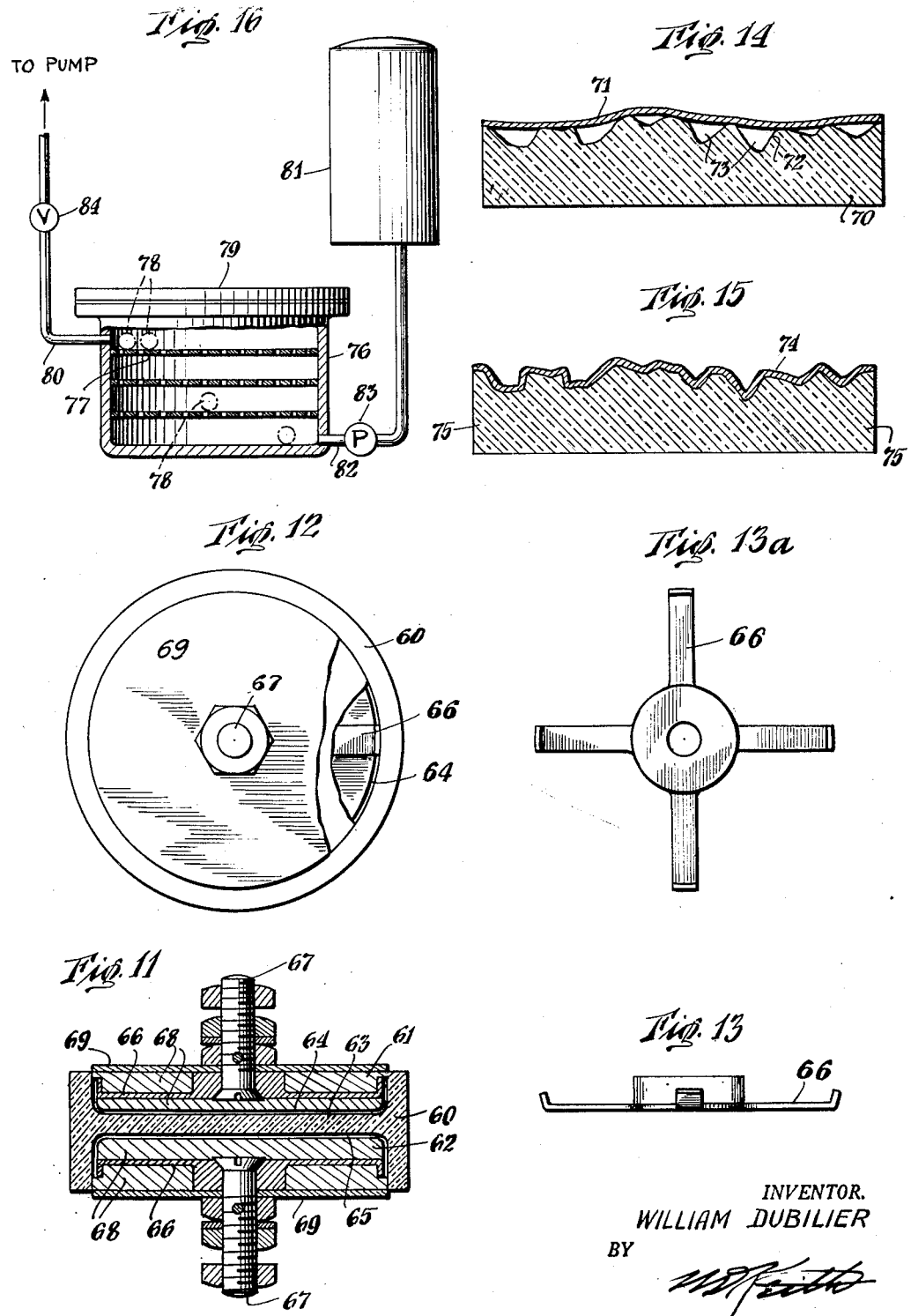
INVENTOR.
WILLIAM DUBILIER
BY
ATTORNEY Patented Feb. 9, 1954

2,668,935

UNITED STATES PATENT OFFICE 2,668,935

CAPACITOR CONSTRUCTION

William Dubilier, New Rochelle, N. Y., assignor to Cornell-Dubilier Electric Corporation, South Plainfield, N. J., a corporation of Delaware Application January 12, 1949, Serial No. 70,525

7 Claims. (Cl. 317—242)

This invention relates to improvements in the construction of electrical condensers or capacitors, more particularly to such capacitors of the kind in which the dielectric between the metal electrodes or armatures of the capacitor is provided by plates of ceramic, or equivalent insulating material, the surfaces of which bear metallic layers or coatings serving as the capacitor electrodes. The invention also relates to improved methods of making capacitors, insulators and similar electrical assemblies which include as a constituent part a ceramic, or equivalent insulating material, bearing on its surface an applied metallic layer which serves as an electrode.

Among the general objects of the invention is the provision of capacitors of the type above described having improved structures, especially suitable for use in high frequency and high voltage circuits, which are both simple in design and easy to manufacture and assemble; which are strong and compact mechanically while insuring firm and permanent electric connection between the electrode layers and the terminal elements of the capacitor; and which will result in a favorable current flow into and out of the capacitor with a minimum of electrical losses and greater effectiveness of heat dissipation.

An object of the invention is the provision of improved capacitor assemblies utilizing as a dielectric a ceramic body of relatively high dielectric constant.

Another object of the invention is to provide a method of so depositing an electrically conducting metallic layer on a ceramic surface, or the surface of an equivalent insulating material, as to avoid, or substantially avoid, lack of interfacial continuity between said layer and said surface.

A further object of the invention is the provision of an improved form of contact or terminal member for effecting connection with the electrode coatings in both a single capacitor unit or an aggregate of individual units.

Still another object is to increase the current carrying capacity of a ceramic capacitor unit or aggregate of units, substantially without increasing the size of the units and terminal structures.

A further object is to provide an improved capacitor structure of the above type which can be readily and easily assembled into either a desired series or parallel arrangement of individual units, to suit any existing requirements of either operating current or voltage or both.

A further object is to provide a simple and efficient assembly structure for mounting and interconnecting a plurality of ceramic capacitor units, especially for use in high voltage apparatus for both high and low frequencies.

Another object of the invention is a capacitor assembly having improved electrical characteristics and superior mechanical resistance to shock or other stresses encountered in use.

The attached drawings are useful to the description of the invention, its purposes and advantages and the above stated and further objects.

In the drawings:

Figure 1 is a top view of an improved ceramic capacitor unit representing one embodiment of the principles of this invention;

Figure 2 is a cross-sectional view taken on line 2—2 of Figure 1;

Figure 3 illustrates the initial step in the fabrication of preferred supporting and connecting elements for mounting and assembling a plurality of capacitor units into a multiple capacitor aggregate;

Figure 4 is a top view of the mounting and connecting element;

Figure 5 is a cross-section taken on line 5—5 of Figure 4;

Figure 6 is an elevational view of a complete mounting assembly comprising a plurality of capacitor units electrically connected in parallel;

Figure 7 shows a similar assembly comprising series-parallel connected units;

Figure 8 is an elevation, partly shown in cross-section, of a modified capacitor assembly comprising series connected units;

Figure 9 is a top view of the structure shown in Figure 8;

Figure 10 is an elevation, partly shown in cross-section, of a modified capacitor unit constructed in accordance with the invention;

Figure 11 is a side sectional view of another capacitor embodying the principles of the invention in further modified form;

Figure 12 is a top view of the capacitor shown in Fig. 11;

Figure 13 is a side view of the mounting bracket used in the assembly shown in Figs. 11 and 12;

Figure 13a is a top view of the mounting bracket shown in Figure 13;

Figure 14 is a greatly enlarged schematic representation, in cross section, illustrative of a metallic electrode deposited on a ceramic surface by prior art methods;

Figure 15 is a greatly enlarged schematic representation, in cross section, illustrative of a ceramic surface on which is deposited a metallic electrode, a comparison between this figure and Figure 14 serving to illustrate the results toward which the methods of this invention are directed; and Figure 16 is a schematic representation, partly in section, of an impregnating apparatus.

Referring to Figures 1 and 2, there is shown a double-sided pot of ceramic or equivalent dielectric material comprising a central disc or web 10 provided with lateral cylindrical flanges or rims 11 on the opposite sides thereof. The opposite faces of the web 10 are coated with metallic layers 13 which may be applied by the use of any of the known coating or metallizing methods but which, in a preferred structure, are applied

ceramic body 10 provided with metal coatings 13 of the illustrative unit shown in Figures 1 and 2. The terminal members 40 are in the form of a metallic cylinder of relatively thin metal sheet and being open at both ends. The inner end of the cylinder is slotted to provide a series of resilient teeth extending in an axial direction with the ends of alternate teeth extending inwardly at an angle, as shown at 42 and 41, respectively. In this manner, a close resilient fit of the member 40 as well as intimate electrical contact with the coatings 13 will be insured. The members 40 are further secured by soldering to the coatings 13 in the manner described hereinabove in connection with the unit shown in Figures 1 and 2.

The outer edges of the members 40 are spun outwardly to form beads 43 which may encompass wires 44 to provide additional mechanical strength. The beads 43 of adjacent units are clamped into firm mechanical and electrical engagement by means of arcuate trough-shaped clamps 45 encompassing the adjacent beads and being tightened circumferentially by means of bolts 47 and nuts 48 passing through holes in the adjacent radial flanges 46 of the clamps. Although three clamps each encompassing an angle of about 120° have been shown in the drawing, any other number such as a pair of semi-circular clamps may be provided. Equivalent clamping means may of course be used. Suitable angular mounting and/or connecting lugs 50 may be furthermore provided, clamped between the heads of the bolts 47 or the nuts 48 and the adjacent flanges 46, as shown.

The uppermost terminal member 40 is shown closed by an inverted cup-shaped member 51 provided with a bead 52 and clamped into engagement with member 40 in substantially the same manner as the remaining capacitor units.

Referring to Figure 10, there is shown a modified construction of a capacitor unit. According to this embodiment, the terminal member comprises a cylindrical portion 55 of relatively thin metal and having one edge soldered to the metal coating 13 in the manner shown and described in Fig. 10 or in the manner shown and described in relation to Figures 1 and 2. Portion 55 is in turn closed by a cap 56 which may consist of relatively heavier metal and may be secured by soldering as shown at 57, or in any other suitable manner. Although, in the example shown, the cap 56 engages the inside of the cylindrical portion 55, the cap may fit over the outside of the portion 55. Cap 56 has secured to it a central threaded plug 18 for connecting adjacent units in substantially the same manner as described in connection with Figures 1 and 2. The space enclosed by the terminal member may again be filled with insulating material alternatively with a suitable metal 58 such as lead poured in liquid condition through the plug 18. In the latter case, it is advisable before introducing the molten metal to coat the metal layer 13 and the adjacent surfaces of the portion 55 with a layer of varnish in order to prevent the metal from effecting or destroying the electrode coatings. A metallic filling of this type has the advantage of affording a better heat dissipation on account of the increased heat conductivity of the metal as compared with insulating material.

The preferred constructions just described may be, of course, simplified or otherwise changed to meet the conditions of use to which the capacitor unit is to be put. For example, referring to Figures 11 to 13, and 13a, inclusive, a cylindrical ceramic body 60, divided into two chambers 61, 62 by a partition 63, forms the capacitor body. The metallic electrode coatings 64, 65 are deposited in the chambers 61, 62 and extend along the inner surfaces of the cylindrical body 60.

The terminal connection to the electrodes 64, 65 is formed by inserting a suitably sized four-armed metallic spider 66 into each of said chambers so that the arms of each spider contact the metallic electrode coatings. Pinned bolts 67, centrally mounted on each spider 66, serve as a connection to external terminal leads. The spiders 66 are held in firm contact with the electrodes 64, 65 by a filler 68 which may, as above described, be metal or other material. If desired, plates 69 may be mounted on the bolts 67 for various purposes, such as providing a finished surface, a protective means, or an identification plate.

In any of the various constructions noted above the connections between the deposited metallic electrodes are such that stresses applied to the capacitor assembly may be imparted, in part, to the deposited, or otherwise applied, metallic films which serve as the electrodes. While the constructions embodying the present invention are less prone to impart such stresses to the electrodes than are many prior structures, the problem of protecting the thin metallic films from injury is ever present. Moreover the use of ceramic materials as dielectric presents specific electrical problems inherent to the application of, and continued operational of efficiency of metallic films on ceramic surfaces. These electrical problems are enhanced and present major difficulties when the ceramic used has a high dielectric constant. The methods of the present invention are directed to a solution of the mechanical and electrical problems encountered in the use of ceramic dielectrics in capacitors, insulators or similar electrical assemblies and are specifically useful when employed to form ceramic-electrode assemblies such as are constituent parts of the capacitor constructions and assemblies above described. The methods, however, are of wide use wherever a ceramic dielectric is employed and, as will be evident from the specific discussion which follows, are particularly useful wherever a solid dielectric of high dielectric constant presents to the electrode-applying operation, a microscopically rough surface.

The problems presented by prior methods of applying metallic coatings on such materials are best explained with reference to Figure 14, which depicts a ceramic dielectric 70 to which a metallic film 71 has been applied by conventional methods. This illustration exaggerates the roughness of the surface 72 of the dielectric and, perhaps, the minimum area of contact of the film 71 with that surface, but the figure illustrates a lack of interfacial continuity between the film 71 and the surface 72 because of the microscopically sized spaces or valleys such as 73 which form the surface of the dielectric. The conventional methods employed in depositing the metallic electrodes upon the ceramic surface, such as the brushing of a metallic paint on the surface or the application of a reducible metal oxide followed by heating to effect reduction thereof, usually provide a coating which, for the reasons indicated in Figure 14, lacks intimacy or continuity of interfacial contact with the rough dielectric surface. When the metallic electrode is thus formed, applied tensions of a service character may serve to separate at least a part of the metallic electrode from the

metallic electrodes deposited on each of said electrode receiving surfaces and extending on to the adjacent contiguous surfaces of said lateral cylindrical flanges, substantially cylindrically shaped terminal members the ends of which are positioned within said lateral cylindrical flanges remote from said metallic electrodes disposed on said disc, said ends having thereon a plurality of radial slots forming resilient toothed surfaces disposed in compressive engagement with the portions of said metallic electrodes disposed on said contiguous surfaces of said lateral cylindrical flanges at locations remote from the portions of the metallic electrodes disposed on said disc portion, means associated with said terminal members for external connections thereto, and said portions of said ceramic body enclosed by said lateral cylindrical flanges being filled with a bonding material intimately engaging said toothed portions of said terminal members for bonding said terminal members to the other portions of said capacitor assembly whereby localized damaging stresses are distributed uniformly over the entire capacitor assembly.

4. A capacitor assembly comprising a ceramic body portion formed by a disc having lateral cylindrical flanges on the opposite sides thereof, said disc shaped to provide electrode receiving surfaces on the opposite sides thereof separated by a substantially constant thickness of ceramic, metallic electrodes disposed on each of said electrode receiving surfaces and extending on to the adjacent contiguous surfaces of said lateral cylindrical flanges, substantially cylindrically shaped terminal members the ends of which are positioned within said lateral cylindrical flanges remote from said metallic electrodes disposed on said disc, said ends shaped to provide a plurality of outwardly and inwardly projecting resilient teeth, said outwardly projecting teeth disposed in compressive engagement with the portions of said metallic electrodes disposed on said contiguous surfaces of said lateral cylindrical flanges at locations remote from the portions of the metallic electrodes disposed on said disc portion, means associated with said terminal members for external connections thereto, and said portions of said ceramic body enclosed by said lateral cylindrical flanges being filled with a bonding material intimately engaging said toothed surfaces of said terminal members for bonding said terminal members to the other portions of said capacitor assembly whereby localized concentrated damaging stresses are distributed uniformly over the entire capacitor assembly.

5. A capacitor assembly comprising a cylindrical ceramic body portion divided into two open-ended chambers by an internal central partition, said internal partition shaped to provide electrode receiving surfaces in each of said chambers separated by a substantially constant thickness of ceramic, metallic electrodes deposited on each of said electrode receiving surfaces and extending on to the adjacent contiguous surfaces of the cylindrical body portion, substantially cylindrically shaped terminal members, the ends of which are positioned within said lateral cylindrical flanges remote from said metallic electrodes disposed on said central partition, said ends being shaped to provide a plurality of outwardly and inwardly projecting resilient teeth, said outwardly projecting teeth disposed in compressive soldered engagement with the portions of said metallic electrodes disposed on said contiguous surfaces of said lateral cylindrical flanges at locations remote from the portions of the metallic electrodes disposed on said central partition, means associated with said terminal members for external connections thereto and said open-ended chambers being filled with a bonding material intimately engaging said toothed surfaces of said terminal members for bonding said terminal members to the other portions of said capacitor assembly whereby localized concentrated damaging stresses are distributed uniformly over the entire capacitor assembly.

6. A capacitor assembly comprising a ceramic body portion formed by a disc having lateral cylindrical flanges on the opposite sides thereof, said disc shaped to provide electrode receiving surfaces on the opposite sides thereof separated by a constant thickness of ceramic, metallic electrodes disposed on each of said electrode receiving surfaces and on the adjacent surfaces of said lateral cylindrical flanges, open-ended cylindrical terminal members one end of which is shaped to provide a plurality of outwardly and inwardly projecting resilient teeth, said outwardly projecting teeth disposed in compressive soldered engagement with said metallic electrodes, and the other end of which is shaped to provide a beaded rim disposed to be encompassed by arcuate mounting members.

7. A capacitor assembly comprising a substantially cylindrically shaped body portion divided into two chambers by an internally centrally disposed partition, said internal partition shaped to provide electrode-receiving surfaces in each of said chambers separated by a substantially constant thickness of ceramic, metallic electrodes deposited on each of said electrode-receiving surfaces and extending on to the adjacent contiguous surfaces of the cylindrical body portion, terminal members disposed within said chambers remote from said metallic electrodes disposed on said central partition and including separated means disposed in compressive resilient engagement with the portions of said metallic electrodes disposed on said ceramic body portion remote from the portions of said metallic electrodes disposed on said central partition, and said chambers being filled with a bonding material intimately engaging said separated means for bonding said terminal members to the other portions of said capacitor assembly whereby localized damaging stresses are distributed substantially uniformly over the entire capacitor assembly.

WILLIAM DUBILIER.

References Cited in the file of this patent

UNITED STATES PATENTS

| Number | Name | Date |
|---|---|---|
| 1,479,315 | Pickard | Jan. 1, 1924 |
| 1,797,878 | Palm | Mar. 24, 1931 |
| 2,129,008 | Kater | Sept. 6, 1938 |
| 2,321,587 | Davie | June 15, 1943 |
| 2,429,089 | Box | Oct. 14, 1947 |
| 2,492,742 | Grasheim | Dec. 27, 1949 |

FOREIGN PATENTS

| Number | Country | Date |
|---|---|---|
| 478,207 | Germany | June 20, 1929 |
| 601,961 | Germany | Aug. 28, 1934 |
| 613,670 | Great Britain | Dec. 1, 1948 |

OTHER REFERENCES

"Electronics," January 1945, page 54.

Ser. No. 404,984, Schneider (A. P. C.), published May 18, 1943.